March 21, 1944.  L. ADAMS  2,344,664

BOX DUMPING APPARATUS

Filed Feb. 11, 1941  2 Sheets-Sheet 1

Inventor
Loyd Adams
By Lyon & Lyon
Attorneys

March 21, 1944. L. ADAMS 2,344,664
BOX DUMPING APPARATUS
Filed Feb. 11, 1941 2 Sheets-Sheet 2

Inventor
Loyd Adams
By Lyon & Lyon
Attorneys

Patented Mar. 21, 1944

2,344,664

UNITED STATES PATENT OFFICE 2,344,664

BOX DUMPING APPARATUS

Loyd Adams, Maywood, Calif., assignor to Calavo Growers of California, Los Angeles, Calif., a corporation of California Application February 11, 1941, Serial No. 378,370

7 Claims. (Cl. 214—1.1)

This invention relates to box dumping apparatuses, and more particularly to an apparatus for dumping easily bruised fruit from the picking boxes for processing in a packing house.

In the handling of fruit in packing houses, particularly fruit having a very easily bruised or damaged skin, a problem has presented itself of removing the fruit from the picking boxes and placing them in the processing apparatus in such a manner as to avoid bruising or damaging of the fruit or the fruit skin. This problem has particularly presented itself in the handling of avocados or alligator pears, the skin of which is very easily bruised, and the bruising of the fruit is followed by bruising the pulp or flesh of the fruit.

It is therefore an object of this invention to provide an apparatus for the handling and dumping of avocados or similar fruit-picking boxes which insures the handling of the fruit in such manner that the skin or surface is not bruised or damaged.

Another object of this invention is to provide an apparatus for handling of easily bruised fruit such as avocados, or alligator pears, which includes a means for conveying picking boxes containing the fruit to the point of their treatment, moving the picking boxes relative to a cover member urged against the fruit in the picking boxes under a relatively light pressure, inverting the boxes with the fruit so held, moving the picking boxes away from the cover member, and allowing the fruit to spill out over the cover member onto a suitable conveyer or into a suitable treating member.

Other objects and advantages of this invention it is believed will be apparent from the following detailed description of a preferred embodiment thereof as illustrated in the accompanying drawings.

Figures 1, 7:
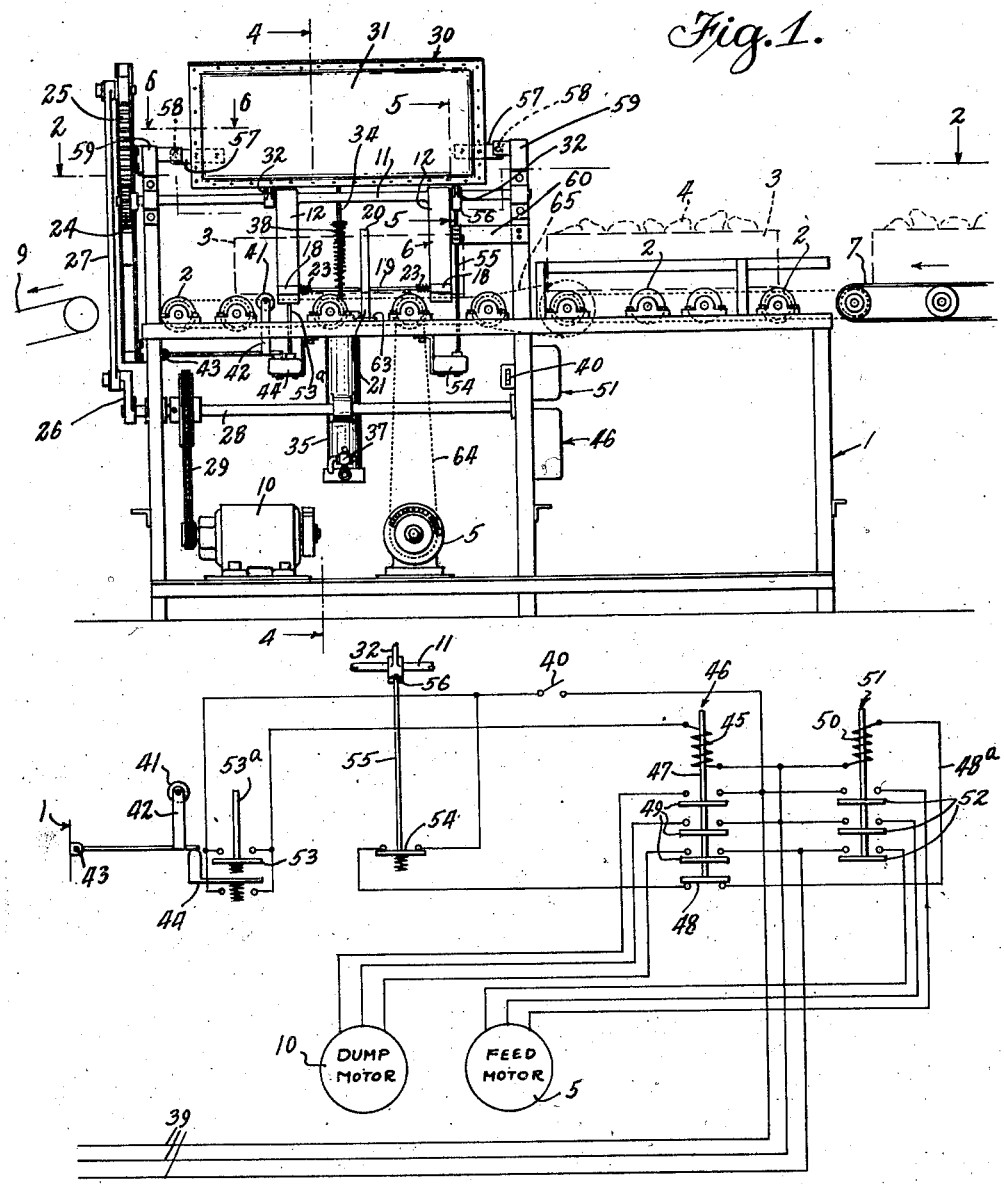
Figure 1 is an elevation of a box-inverting apparatus embodying my invention, illustrating the apparatus in the position of rest after a picking box has been dumped and returned thereto.
Figure 7 is a circuit diagram.

In the preferred embodiment of my invention as illustrated in the accompanying drawings, 1 indicates a frame upon which conveyer rollers 2 are supported to provide a live or driven conveyer for the picking boxes 3 containing fruit such as avocados or alligator pears 4. A motor 5 is provided for driving the live conveyer rollers 2 for conveying the picking boxes 3 to a position where they may be engaged by the gripping or elevating means 6 supported with relation to the conveyer rollers 2.

Conveyer means 7 of any suitable or desirable type are provided for conveying the picking boxes 3 from their point of delivery at the packing house to the dumping apparatus and a conveyer means 8 is provided for conveying the fruit 4 from the dumping apparatus to the processing machines or devices. A conveyer 9 is provided for conveying the empty boxes away from the dumping apparatus.

A second or dumping motor 10 is provided for actuating the elevating or dumping arms 6. The arms 6, generally of L shape, are supported adjacent and elevated from one side of the conveyer provided by the live rollers 2 and are thus supported or secured to an elevating shaft 11. The generally vertical portions 12 of the arms 6 extend downwardly from the shaft 11 and the horizontal reach 13 of said arms extends between the live rollers 2 in position to pass under the picking boxes 3. There may be as illustrated two such elevating arms 6 spaced apart a sufficient distance to properly support the picking boxes 3 and the distance of their spacing will be determined by the length of the boxes.

Journaled in bearing sections 14 on the arms 6 are gripper shafts 15 which extend between the vertical sections 12 of the arms 6. Secured to the shaft 15 are gripper members 16 which are provided with actuating arms 17.

Journaled in bearing sections 18 at the forward ends of the reach sections 13 is a shaft 19 carrying similar gripping members 20 having a release arm 21. Each of the gripper members 16 and 20 is provided at its upper end with a box gripping finger 22 adapted to fit over the edge of the box 3 to maintain the same upon the elevating arms 6. Coil springs 23 yieldably urge the grippers 16 and 20 to gripping position, there being one set of such torsion springs for each of the shafts 15 and 19, respectively.

The elevating shaft 11 is actuated by means of a pinion 24 in mesh with a rack 25. The rack 25 is reciprocated to drive the pinion 24 by means of a crank 26 and pitman 27 connecting the rack and crank. The crank 26 is secured to a shaft 28 journaled in bearings supported by the frame 1 and the shaft 28 is driven from the dumping motor 10 through a suitable drive connection 29.

In order to hold the fruit 4 in the picking boxes 3 firmly so as to prevent freedom of movement of the fruit in the boxes 3 as the boxes 3 are elevated and inverted, a cover member 30 is provided, and this cover member is provided with a padded engaging surface 31, the padding of which may be of any suitable yielding material such, for example, as sponge rubber or the like.

The cover 30 is supported by arms 32 which are journaled on the shaft 11. The cover 30 is provided with an arm 33 which is connected with a piston rod 34 which in turn is secured to a piston mounted within a cylinder 35. The cylinder 35 is journaled on the shaft 28 secured to the frame 1, this to permit shifting of position of the cylinder 35 as the cover 30 is caused to rotate around the shaft 11 with, and due to, the movement of the box 3. The cylinder 35 is provided with a relief valve 37 which is set to relieve air pressure back of the piston within the cylinder so that the pressure developed does not ordinarily exceed the weight of a single fruit for the reason as will hereinafter be apparent. A spring 38 is provided to aid in returning the cover 30 to its starting position.

In order to actuate the dumping apparatus automatically as current is supplied from the mains 39 the following means are provided: A main switch 40 is provided to enable manual control of the automatic means when it is desired to start or stop the operation. On closing the main switch 40, the motor 5 is set in operation to drive the live rollers 2 to thereby move the box 3 into position over the reaches 13 of the arms 6. When a box is moved to this position, it engages a roller 41 carried by an arm 42 pivotally supported as indicated at 43 on the frame 1. This arm when depressed by the weight of a filled box, actuates a switch 44 to complete the circuit to a coil 45 of a switch 46, causing the switch bar 47 to be actuated to a position to break the contact 48 in the feed motor 5 control line 48a and to move the connectors 49 to position to complete the circuit to set the dump motor 10 in operation.

Movement of the breaker 48 disrupts the current supply to the coil 50 of the switch 51 with the result that the contacts 52 move to the position to open the circuit to the feed motor 5.

A second relay switch 53 is moved to open position when the horizontal reaches 13 of the arms 6 are moved to box-receiving position to engage the switch arm 53a.

A relay switch 54 is adapted to be actuated by its switch rod 55 being engaged by a cam 56 carried by the cover arm 32 as the cover arm 32 is caused to travel around the shaft 11 by raising of the box 3. This operation opens the relay switch 54, breaking the supply line 48a.

A stop means is provided for determining the limit of the lower position of the cover 30 and includes a stop arm 57 carried by the cover 30 in position to engage a yieldable stop 58 carried by the upright 59 of the frame 1. The switch arm 55 is guided in a bearing arm 60 likewise secured to the frame upright 59.

Figures 2, 3, 4, 5, 6:
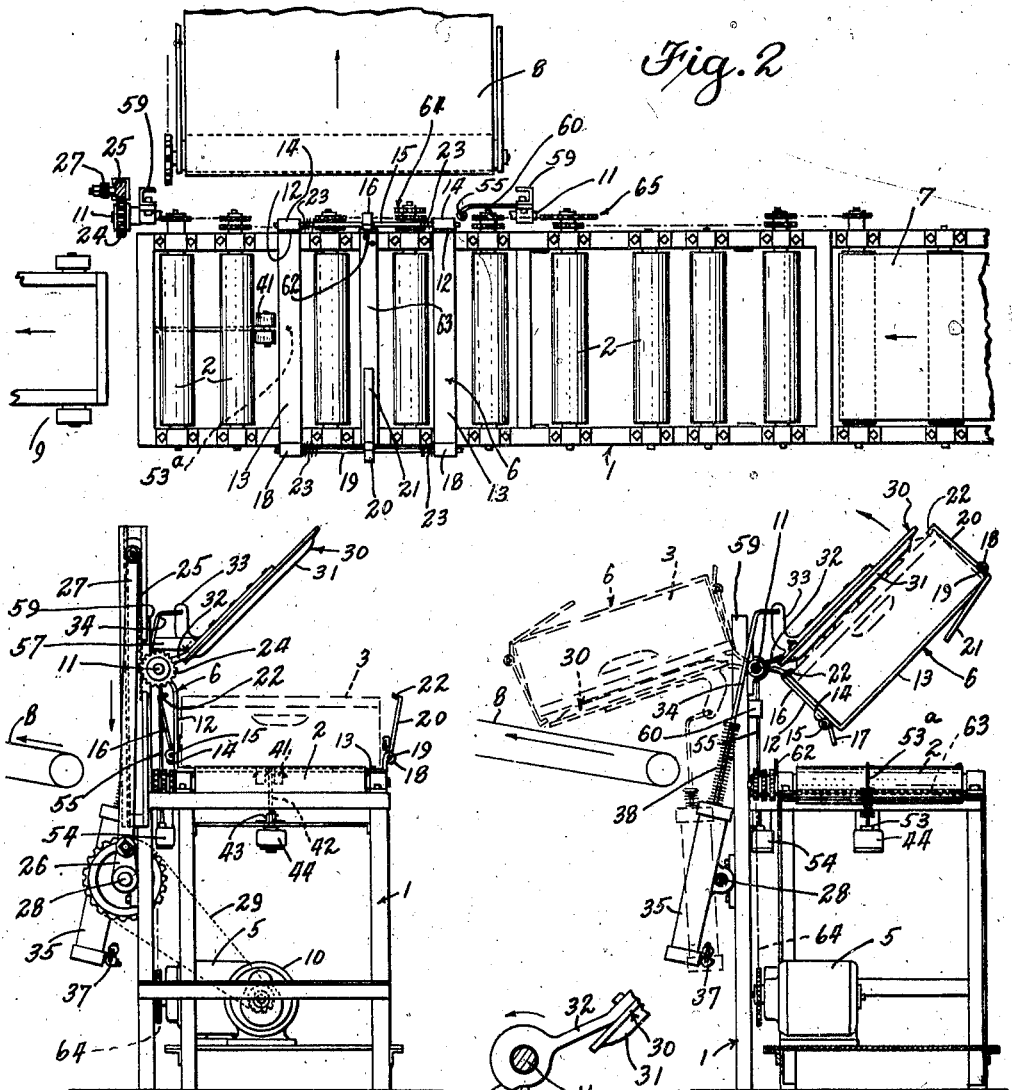
Figure 2 is a sectional plan view taken substantially on the line 2—2 of Figure 1.
Figure 3 is an end elevation viewed from the left of Figure 1.
Figure 4 is a sectional end view taken substantially on the line 4—4 of Figure 1.
Figure 5 is an enlarged fragmental detail of a cover bearing cam switch actuating member embodying my invention.
Figure 6 is a fragmental detail of the cover return stock means embodied in my invention.

The operation of the box-dumping apparatus embodying my invention is as follows:

The switch 40 is closed manually, thereby setting in operation the feed motor 5 to move a picking box 3 into position over the reaches 13 of the elevating arms 6. This operation closes the circuit to the dump motor 10 as heretofore set forth by the box engaging the roller 41 and due to the fact that the box is filled and of sufficient weight to close the switch 44. As heretofore set forth, the motor 10 is set in operation moving the rack 25 downwardly to rotate the pinion 24 and shaft 11 in a counter-clockwise direction as viewed in Figure 3, raising the picking box 3 to position to engage the pad 31 with the fruit 4 and further raising of the box 3 moves the cover 30 with the box, resulting in opening of the switch 54 in the feed motor current supply. The dump motor continues to operate, rotating the box 3 and cover 30 to the inverted position illustrated in dotted lines in Figure 4.

The rack 25 then moves upwardly under the continuing action of the motor 10 and crank 26, moving the picking box 3 away from the cover 30, permitting the fruit to roll along the pad 31 to the conveyer 8 which takes the fruit away from the dumping apparatus.

As the valve 37 is set with reference to the weight of the fruit, the cover 30 remains in the inverted position until all of the fruit has rolled onto the conveyer 8, after which the spring 38 and force of fluid or air within the cylinder 35, acting on the piston rod 32, returns the cover to its starting position, reestablishing current supply through the switch 54 to the feed motor 5.

During this operation the empty box 3 has been returned to the live rollers 2 but its weight is insufficient to depress the roller 41 to complete the electrical circuit through the switch 44.

When the box is lowered, the release arms 17 and 21 of the grippers 16 and 20, respectively, engage a stop plate 62 and 63, respectively, releasing the grippers from the edges of the box. As a second picking box 3 is then moved forward by the live rollers 2, the empty box is pushed along the rollers to the empty box conveyer 9 and is conveyed away from the machine. This operation repeats itself automatically as long as the switch 40 is closed.

The live rollers 2 are driven through suitable transmission drives 64 and 65, respectively.

It will be apparent from the foregoing that my box dumping apparatus provides a means for maintaining the fruit from movement in the picking boxes as they are elevated and inverted, and also provides a means dependent upon the weight of the fruit for guidingly rolling the fruit onto the conveyer 8 after the fruit has been dumped, thereby insuring transfer of the fruit from the picking box 3 to the conveyer 8 with no possibility of damage to the skin of the fruit.

Having fully described my invention, it is to be understood that I do not wish to be limited to the details herein set forth, but my invention is of the full scope of the appended claims.

I claim:

1. In an article handling device, the combination of a frame, a container gripping means pivotally supported by the frame, a cover pivotally supported by the frame, means for rotating the container gripping means to invert the container, the cover being positioned in the path of movement of the container to be moved therewith, means operatively connected with the cover and the frame for resisting movement of the cover whereby the cover is yieldably forced against the container during inversion of the container, the said latter means being operative to permit the cover to remain in inverted position as determined by the weight of an article on the cover as the container rotating means operates to lift the container away from the cover, and being operative to return the cover to its position in the path of a container when the contents of the container have been discharged off from the cover.

2. In a container dumping device, means for conveying a container to dumping position, means for gripping the container, means for elevating and inverting the container, a cover, supporting means for supporting the cover in position in the path of movement of the container whereby the cover is moved with the container, yielding means for resisting movement of the cover with the container whereby the cover supports the contents of the container in the container during inversion of the container, the container elevating and inverting means being operable to reverse the movement of the container after it has reached inverted position, and the yielding means operating to exert a force against the cover tending to return the cover to its starting position, such force being insufficient to move the cover until all of the contents of the container have been discharged off of the cover.

3. In a box dumping device, the combination of means for conveying a box to a dumping position, means at the dumping position for picking up the box and for elevating and inverting the box, a cover positioned in the path of the box to engage the contents thereof as the box is elevated, means for yieldably resisting the movement of the cover with the box, said yielding means exerting a force against said cover sufficient to retain the contents in the box as the box is inverted, means for elevating and inverting the box being operable to reverse the movement of the box away from the cover after reaching inverted position, and the yielding means tending to force the cover against the box being then capable of exerting a force to return the box to its starting position of only such a magnitude that when an article from the box is on the cover, it will overcome the force of the yielding means to retain the cover in its inverted position.

4. In a box dumping device, the combination of a means for gripping a box, means for pivotally supporting the gripping means, means for rotating the gripping means around the support, a cover, means whereby the cover is pivotally supported in the path of movement of the box, a check device, means operatively connecting the check device with the cover, a spring operatively associated with the check device, the check device being operable to force the cover against the box with sufficient force to hold the contents in the box as the box is inverted and until the box has reached inverted position, the spring being operable to exert a force against the box to return the box to its original position, the force exerted by the spring being related to the weight of a single article contained in the box whereby the cover will remain in inverted position until all articles from the box are discharged over the cover.

5. In a device for handling fruit, the combination of means for inverting a picking box of such fruit, a cover positioned in the path of movement of said picking box to engage the fruit therein during inversion of the box, a check device for yieldably urging the cover toward the box to retain the contents therein during inversion of the box, spring means for returning the cover to its original position, the inverting means being operable to raise the box after it is inverted, the spring means for returning the cover being operable to exert a force sufficient to return the cover to its starting position but insufficient to move the cover until all of the contents of the box have been discharged over the cover.

6. In a device of the class described, the combination of a conveyor means for conveying a picking box, means for gripping and inverting the picking box, a cover, means for positioning the cover in the path of movement of the picking box so that the cover will engage the contents of the box prior to inversion of the box and retain the contents within the box, check means for yieldably holding the cover against the contents of the box with sufficient force to prevent discharge of contents from the box, the box inverting means being operable to raise the box from the cover after the box has been inverted, and yieldable means operable to return the box cover to its position in the path of movement of a box, the force exerted by said yieldable means being related to the weight of a single article within the box so that it does not operate to move the cover until the contents of the box have been discharged thereover, means for returning the inverted box to the conveyer, means for disrupting the drive of the inverting means, and means for reestablishing the drive of the conveyer means.

7. In a device for handling fruit, the combination of means for inverting a picking box of such fruit, a cover, means for supporting the cover in the path of movement of the box whereby the cover engages the contents of the box prior to inversion of the box, the said supporting means including a check means for yieldably urging the cover toward the box under a force sufficient to retain the fruit in the box during inversion of the box, the yielding means being operable to expend its yielding force against the cover when the box and cover are in the inverted position, the box inverting means being operable to move the box away from the cover, and the yieldable means being then operable to exert a force against the cover to cause the cover to travel back to its starting position, the force then exerted being insufficient to move the cover until the contents of the box have been discharged over the cover.

LOYD ADAMS.